United States Patent

Edwards

[11] Patent Number: 6,070,556
[45] Date of Patent: Jun. 6, 2000

[54] ILLUMINATING DOG SAFETY SYSTEM

[76] Inventor: William Edwards, 741 Fenimore St., Brooklyn, N.Y. 11203

[21] Appl. No.: 09/105,446

[22] Filed: Jun. 26, 1998

[51] Int. Cl.[7] ................................................ A01K 27/00
[52] U.S. Cl. .......................... 119/792; 119/858; 119/907
[58] Field of Search ..................................... 119/792, 770, 119/795, 850, 856, 857, 858, 907, 702; 54/18.1, 19.1, 71

[56] References Cited

U.S. PATENT DOCUMENTS

| 76,626 | 4/1868 | Hammond | 54/71 |
|---|---|---|---|
| 78,082 | 5/1868 | Gray | 54/71 |
| 806,858 | 12/1905 | Westrope | 54/71 |
| 1,685,435 | 9/1928 | Philbrick | 119/856 |
| 2,534,727 | 12/1950 | Moyle | 54/71 |
| 3,322,102 | 5/1967 | Windle | 182/3 |
| 3,871,336 | 3/1975 | Bergman | 359/516 |
| 3,999,521 | 12/1976 | Puiello | 359/518 |
| 4,091,766 | 5/1978 | Colliard | 359/518 |
| 4,167,156 | 9/1979 | Kupperman et al. | 119/795 |
| 4,384,548 | 5/1983 | Cohn | 359/518 |
| 4,559,906 | 12/1985 | Smith | 119/865 |
| 4,982,700 | 1/1991 | Gordon | 119/863 |
| 5,184,762 | 2/1993 | Nevitt | 224/148.6 |
| 5,632,235 | 5/1997 | Larsen et al. | 119/856 |
| 5,896,831 | 4/1999 | Alpert | 119/856 |

FOREIGN PATENT DOCUMENTS

| 2153646 | 8/1985 | United Kingdom | 119/858 |
|---|---|---|---|
| 2188524 | 10/1987 | United Kingdom | 119/858 |
| 2237493 | 5/1991 | United Kingdom | 119/858 |

Primary Examiner—Michael J. Carone
Assistant Examiner—James S. Bergin

[57] ABSTRACT

An illuminating dog safety system for allowing an animal to be more visible at night. The inventive device includes a collar adapted to be worn around a neck of an animal. The collar has a reflective strip extending a majority of a length thereof. A harness is provided that is adapted to be worn around a torso of the animal. The harness is comprised of an upper strap member, a lower strap member, and a longitudinal extension therebetween. The upper strap member, the lower strap member, and the longitudinal extension each have a reflective strip extending a majority of a length thereof. A leash is provided that is adapted for securement to the collar. The leash has a reflective strip extending a majority of a length thereof.

1 Claim, 2 Drawing Sheets

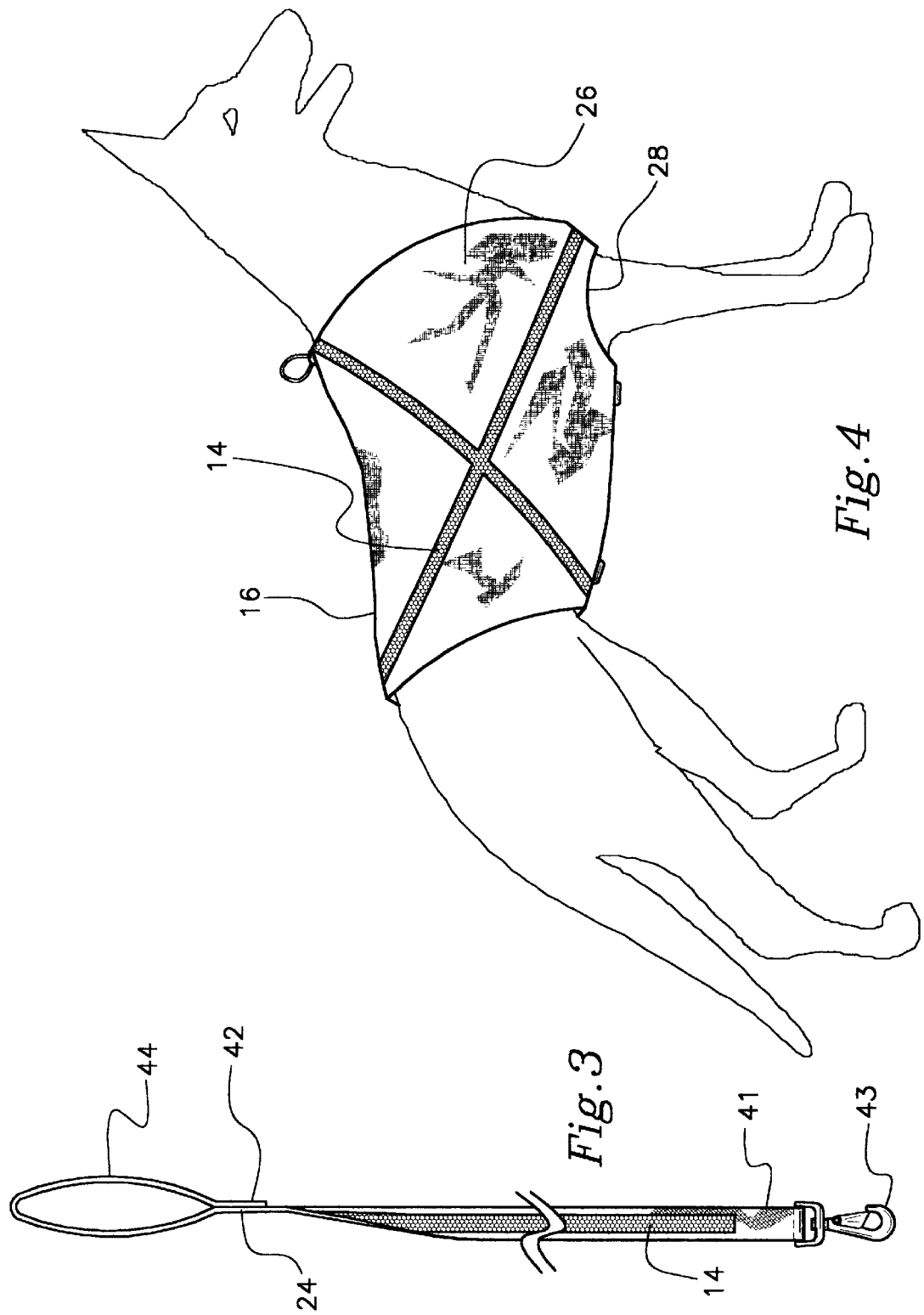

ILLUMINATING DOG SAFETY SYSTEM

BACKGROUND OF THE INVENTION

1. Field of the Invention

The present invention relates to animal collars and more particularly pertains to a new illuminating dog safety system for allowing an animal to be more visible at night.

2. Description of the Prior Art

The use of animal collars is known in the prior art. More specifically, animal collars heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal collars include U.S. Pat. No. 3,452,464 to Robinson; U.S. Pat. No. 4,909,189 to Minotti; U.S. Pat. No. 3,871,336 to Bergman; U.S. Pat. No. 4,266,511 to Muench; U.S. Pat. No. 4,407,233 to Bozzacco; and U.S. Pat. No. 4,091,766 to Colliard.

While these devices fulfill their respective, particular objectives and requirements, the aforementioned patents do not disclose a new illuminating dog safety system. The inventive device includes a collar adapted to be worn around a neck of an animal. The collar has a reflective strip extending a majority of a length thereof. A harness is provided that is adapted to be worn around a torso of the animal. The harness is comprised of an upper strap member, a lower strap member, and a longitudinal extension therebetween. The upper strap member, the lower strap member, and the longitudinal extension each have a reflective strip extending a majority of a length thereof. A leash is provided that is adapted for securement to the collar. The leash has a reflective strip extending a majority of a length thereof.

In these respects, the illuminating dog safety system according to the present invention substantially departs from the conventional concepts and designs of the prior art, and in so doing provides an apparatus primarily developed for the purpose of allowing an animal to be more visible at night.

SUMMARY OF THE INVENTION

In view of the foregoing disadvantages inherent in the known types of animal collars now present in the prior art, the present invention provides a new illuminating dog safety system construction wherein the same can be utilized for allowing an animal to be more visible at night.

The general purpose of the present invention, which will be described subsequently in greater detail, is to provide a new illuminating dog safety system apparatus and method which has many of the advantages of the animal collars mentioned heretofore and many novel features that result in a new illuminating dog safety system which is not anticipated, rendered obvious, suggested, or even implied by any of the prior art animal collars, either alone or in any combination there of.

To attain this, the present invention generally comprises a collar adapted to be worn around a neck of an animal. The collar has a reflective strip extending a majority of a length thereof. A harness is provided that is adapted to be worn around a torso of the animal. The harness is comprised of a n upper strap member, a lower strap member, and a longitudinal extension therebetween. The upper strap member, the lower strap member, and the longitudinal extension each have a reflective strip extending a majority of a length thereof. A leash is provided that is adapted for securement to the collar. The leash has a reflective strip extending a majority of a length thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who arc not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminating dog safety system apparatus and method which has many of the advantages of the animal collars mentioned heretofore and many novel features that result in a new illuminating dog safety system which is not anticipated, rendered obvious, suggested, or even implied by any of the prior art animal collars, either alone or in any combination thereof.

It is another object of the present invention to provide a new illuminating dog safety system which may be easily and efficiently manufactured and marketed.

It is a further object of the present invention to provide a new illuminating dog safety system which is of a durable and reliable construction.

An even further object of the present invention is to provide a new illuminating dog safety system which is susceptible of a low cost of manufacture with regard to both materials and labor, and which accordingly is then susceptible of low prices of sale to the consuming public, thereby making such illuminating dog safety system economically available to the buying public.

Still yet another object of the present invention is to provide a new illuminating dog safety system which provides in the apparatuses and methods of the prior art some of the advantages thereof, while simultaneously overcoming some of the disadvantages normally associated therewith.

Still another object of the present invention is to provide a new illuminating dog safety system for allowing an animal to be more visible at night.

Yet another object of the present invention is to provide a new illuminating dog safety system which includes a collar adapted to be worn around a neck of an animal. The collar has a reflective strip extending a majority of a length thereof. A harness is provided that is adapted to be worn around a torso of the animal. The harness is comprised of an upper strap member, a lower strap member, and a longitudinal extension therebetween. The upper strap member, the lower strap member, and the longitudinal extension each have a reflective strip extending a majority of a length thereof. A leash is provided that is adapted for securement to the collar. The leash has a reflective strip extending a majority of a length thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of a leash of the present invention.

FIG. 4 is a side view of a harness of the present invention illustrated in place on an animal.

DESCRIPTION OF THE PREFERRED EMBODIMENT

Figure 1:
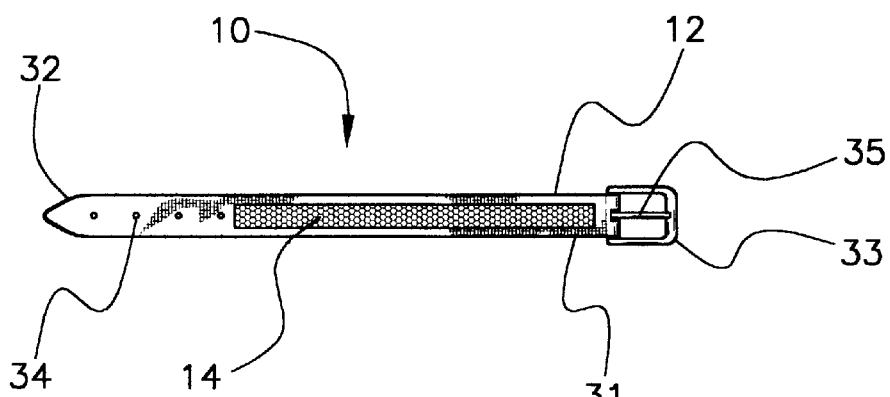
FIG. 1 is a front view of the collar of a new illuminating dog safety system according to the present invention.
Figure 2:
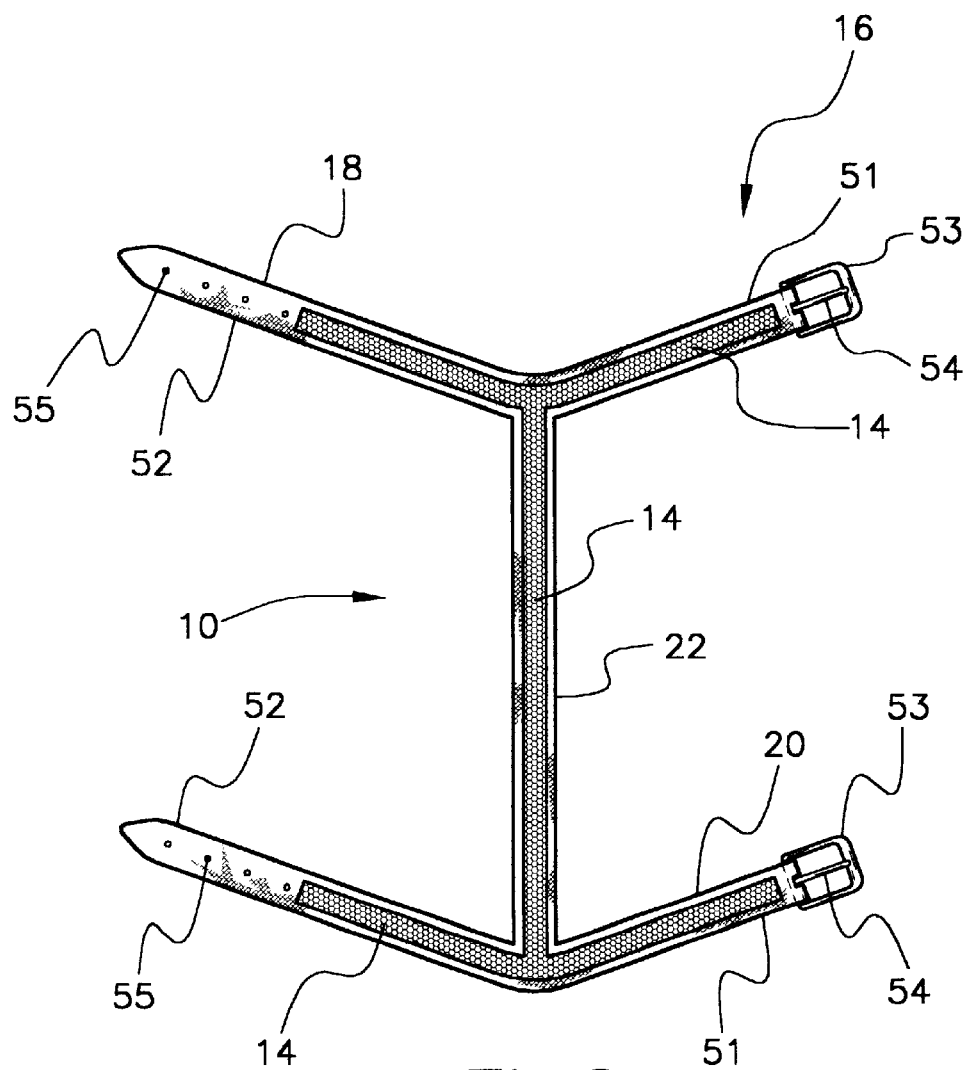
FIG. 2 is a front view of a harness of the present invention.

With reference now to the drawings, and in particular to FIGS. 1 through 4 thereof, a new illuminating dog safety system embodying the principles and concepts of the present invention and generally designated by the reference numeral 10 will be described.

As best illustrated in FIGS. 1 through 4, the illuminating dog safety system 10 comprises a harness 16 that is adapted to be worn around a torso of the animal. The harness 16 is comprised of an elongate upper strap member 18, an elongate lower strap member 20, and a longitudinal extension 22 therebetween. The upper strap member 18, the lower strap member 20, and the longitudinal extension 22 each have a reflective strip 14 extending a majority of a length thereof.

Preferably, the upper strap member 18 and the lower strap member 20 each have a primary end 51 and a secondary end 52. Each of the primary ends 51 of the strap members 18,20 have a buckle 53 extending therefrom. Each buckle 53 has a pin member 54. Each of the secondary ends 52 of the strap members 18,20 has a plurality of apertures 55 extending therethrough for receiving the pin members 54 of the buckles 53.

Preferably, the illuminating dog safety system further comprises an elongate collar 12 that is adapted to be worn around a neck of an animal. The collar 12 has a reflective strip 14 extending a majority of a length thereof. Ideally, the collar has opposite first and second ends 31,32. The first end 31 of the collar 12 has a buckle 33 extending from it. The buckle 33 has a pin member 35. The second end 32 has a plurality of apertures 34 extending therethrough for receiving the pin member 35 of the buckle 33.

Also preferably, an elongate leash 24 is provided that is adapted for securement to the collar 12 or the harness 16. The leash 24 has a reflective strip 14 extending a majority of a length thereof. Ideally, the leash 24 has proximal and distal ends 41,42. The proximal end 41 of the leash 24 has a fastener 43 attached thereto for removable coupling to the collar 12 or harness 16. The distal end 42 of the leash 24 has a loop 44 extending therefrom. The loop 44 provides more secure grasping of the leash 24.

In an alternate embodiment, the harness 16 is adapted to be worn on the body of an animal and comprises a coat member 26 and plurality of reflective strips 14. The coat member 26 has a pair of leg apertures for receiving legs of an animal. The reflective strips 14 extending across the coat member 26, for example in an X-shaped pattern.

In use, the animal owner would simply attach the harness 16 to the torso of the animal. The leash 24 would also be secured to the harness 16, if desired, or to the collar 12. The owner would then take the animal for a walk at night while secure in the knowledge that he and the pet can be easily seen by motorists and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal harness system for increasing the visibility of an animal in the dark, comprising:

a harness adapted to be worn around a torso of the animal, the harness comprising:

a forward strap member for looping about a forward portion of the torso of the animal, the forward strap member having a longitudinal extent with a first portion and a second portion meeting at a medial location of the forward strap member;

a rearward strap member for looping about a rearward portion of the torso of the animal, the rearward strap member having a longitudinal extent with a first portion and a second portion meeting at a medial location of the rearward strap member; and a longitudinal strap member extending between and fixedly connecting the medial locations of the forward and rearward strap members together;

wherein the forward strap member, the rearward strap member, and the longitudinal strap member each have a reflective strip formed on an outward surface of the strap members and extending along substantially the entire length of each of the strap members; and wherein the first portion of the forward strap member is oriented at an angle with respect to the second portion of the forward strap member to form a V-shape and the first portion of the rearward strap member is oriented at an angle with respect to the second portion of the rearward strap member to form a V-shape;

a collar strap member adapted to be worn around a neck of an animal, the collar strap member having a reflective strip formed on the collar strap member and extending along substantially the entire length of the strap member, wherein the collar strap member has opposite first and second ends, the first end of the collar having a buckle extending therefrom, the buckle having a pin member, the second end of the collar strap member having a plurality of apertures extending therethrough for receiving the pin member of the buckle; and a leash adapted for securement to the collar strap member, the leash having a reflective strip extending along substantially the entire length of the leash, wherein the leash has proximal and distal ends, the proximal end of the leash having a fastener attached thereto for removable coupling to the collar strap member, the distal end having a loop extending therefrom;

wherein the forward strap member and the rearward strap member of the harness each have a primary end and a secondary end, each of the primary ends of the strap members having a buckle extending therefrom, each buckle having a pin member, each of the secondary ends of the strap members having a plurality of apertures extending therethrough for receiving the pin member of the buckle;

wherein the first portion of the forward strap member is oriented at an angle of approximately 135 degrees with respect to the second portion thereof; and wherein the first portion of the rearward strap member is oriented at an angle of approximately 135 degrees with respect to the second portion thereof.

* * * * *